United States Patent [19]

Coggiola

[11] 4,378,730
[45] Apr. 5, 1983

[54] CITRUS PRESS DEVICE

[75] Inventor: Marcel Coggiola, Le Perreux, France

[73] Assignee: Robot-Coupe, S.A., Bagnolet, France

[21] Appl. No.: 160,814

[22] Filed: Jun. 18, 1980

[30] Foreign Application Priority Data

Jun. 18, 1979 [FR] France ............................. 79 15502

[51] Int. Cl.³ .............................................. A23N 1/00
[52] U.S. Cl. ........................................ 99/501; 99/503
[58] Field of Search ................................. 99/501–508; 241/37.5, 92, 282.1

[56] References Cited

U.S. PATENT DOCUMENTS 3,892,365  7/1975  Verdun ................................... 241/92
4,113,188  9/1978  Belinkoff ............................. 241/37.5
4,240,338  12/1980  McClean ............................... 99/501

FOREIGN PATENT DOCUMENTS 1542213  10/1968  France .
685987  1/1953  United Kingdom ................... 99/503

Primary Examiner—Philip R. Coe
Assistant Examiner—Timothy F. Simone

[57] ABSTRACT

A citrus fruit juicing attachment for an electrically-driven kitchen robot is described. The attachment of the invention comprises an extension piece for fitting on the motor drive shaft, a basket for mounting on the upper bowl of the kitchen robot which is provided at its edge with a projection adapted to operate a motor control switch and at least one cone which can be driven by the extension piece. The cone can only be mounted in the basket when the extension piece is not engaged therein. The need to remove basket and cone when changing cones, thus disenabling the machine, leads to an increase in safety.

4 Claims, 4 Drawing Figures

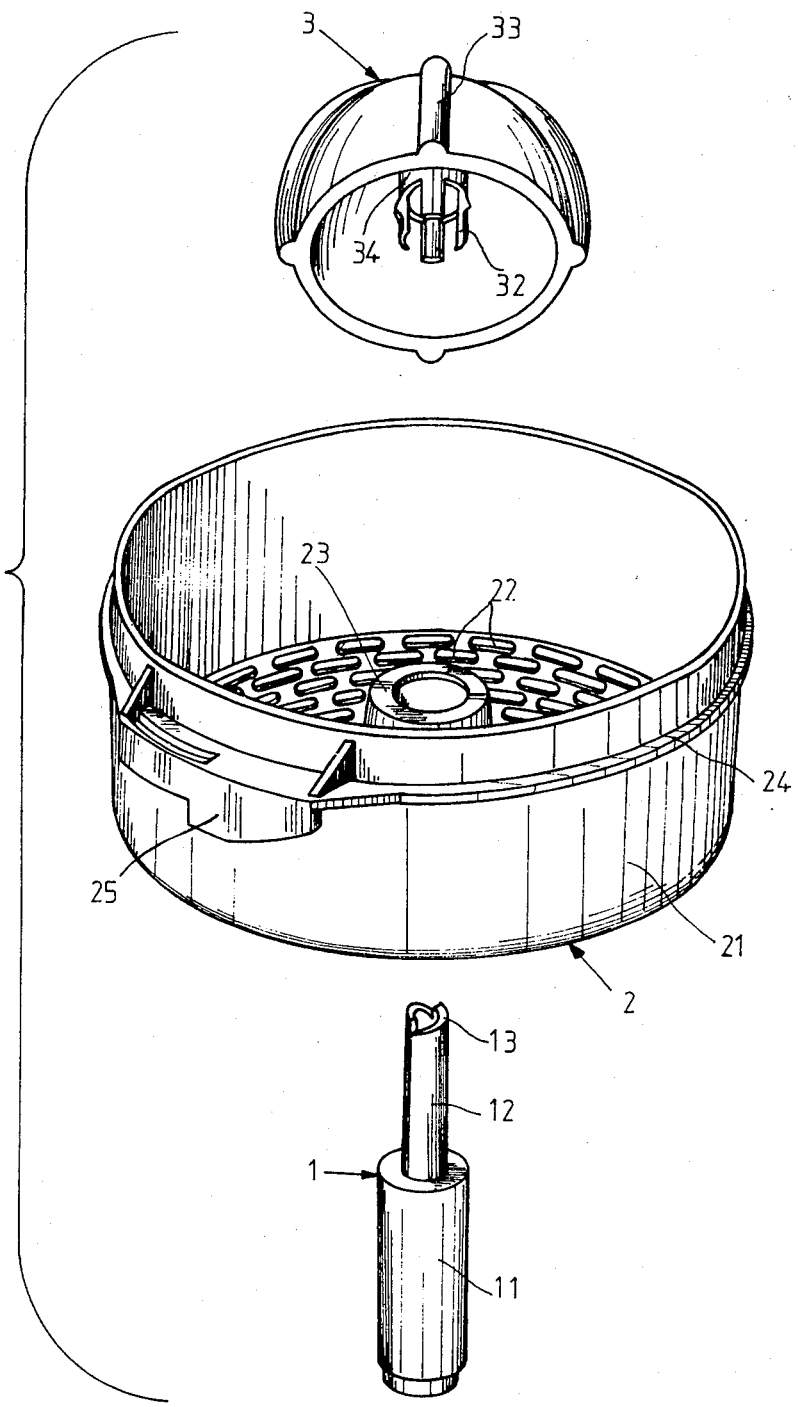

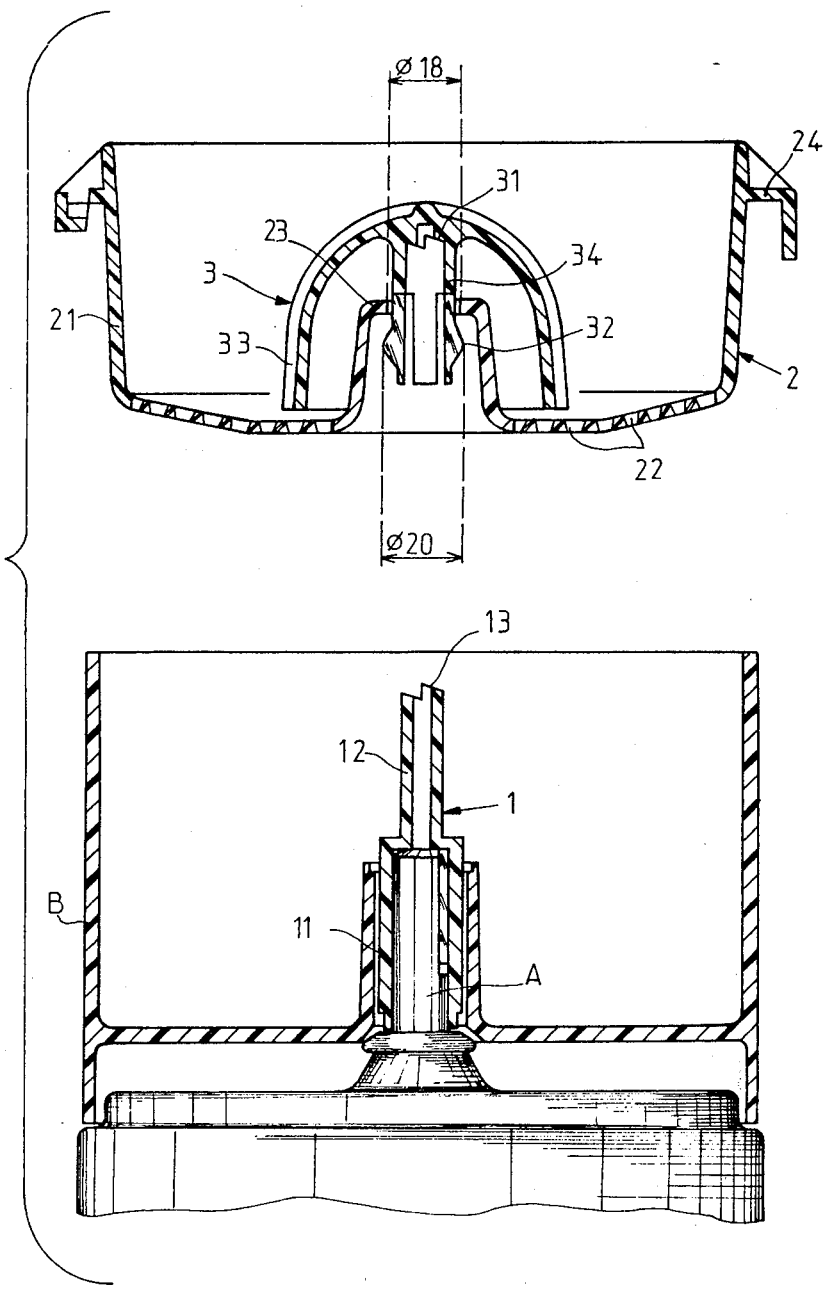

FIG·3
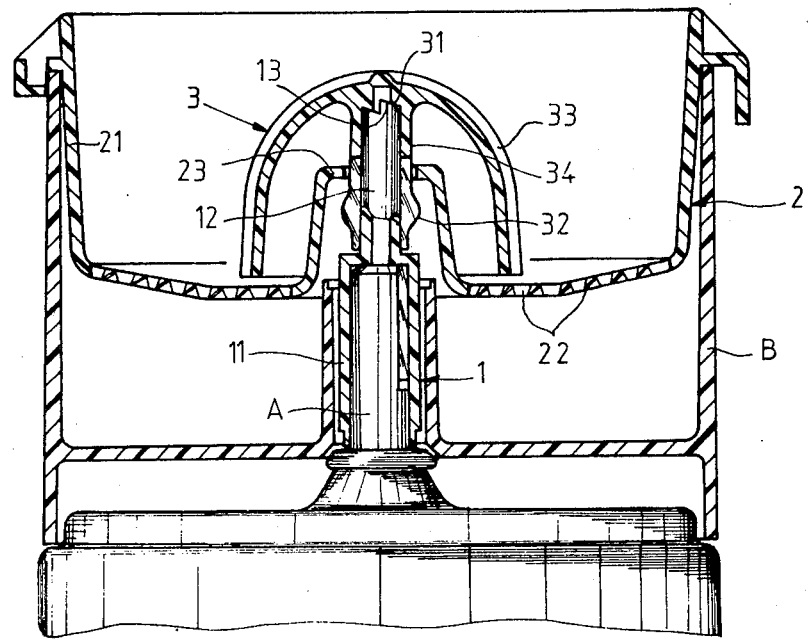
FIG·4
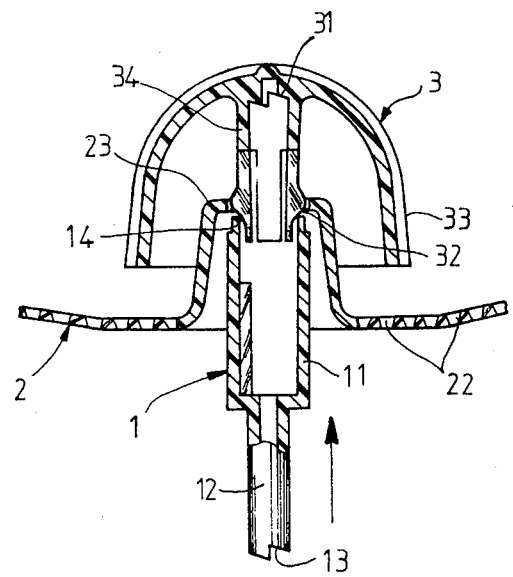

4,378,730

CITRUS PRESS DEVICE

FIELD OF THE INVENTION

This invention relates to motor driven apparatus for extracting the juice from citrus fruit.

BACKGROUND TO THE INVENTION

The present invention concerns citrus press devices which are to be mounted on a so-called kitchen robot device which, by fixing various tools, such as knives, grater discs, mincer discs, etc. on the drive shaft of an electric motor permits various culinary operations to be performed. More particularly, the present invention relates to devices which are to be mounted on apparatus of this type in which the motor can only be put into operation when the cover is in a closure position, the closing of the cover itself assuring in certain cases the actuation of the motor. Apparatus of this type is described in French Patent Specifications Nos. 71.27039 and 77.08648. There is a need for such precautions since the motors used can turn at up to several thousand revolutions per minute, which gives rise to a certain danger.

OBJECTS OF THE INVENTION

It is the object of the present invention to provide means for use with a kitchen robot type of device for extracting juice from citrus fruit.

GENERAL DESCRIPTION OF THE INVENTION

According to the present invention the citrus press device for the kitchen robot comprises a basket and a citrus juice removal cone and which is distinguished by the fact that the basket bears on its periphery means for actuating the motor. According to one characteristic of the invention, the cone is affixed to the motor drive shaft by an extension piece constituting a mechanical transmission between the drive shaft and the cone.

SPECIFIC DESCRIPTION OF PREFERRED EMBODIMENT

Other characteristics and advantages of the invention will appear from the following description which is given by way of illustration and as a non-limiting example. Reference is made to the accompanying drawings, in which:

FIG. 1 is an exploded view of the device;

FIG. 2 is a sectional view showing how the citrus press is mounted on the working head of a kitchen robot;

FIG. 3 is a sectional view of the citrus press in working position; and

FIG. 4 is a schematic drawing showing the ejection of the cone.

In the following the embodiment which is described is designed for use with a kitchen robot of the type described in French Patent Specification No. 71.27039 whose U.S. counterpart is U.S. Pat. No. 3,892,365, but it is of course the case that the apparatus according to the invention can be mounted on other kitchen robot type devices which are appropriately constructed.

Referring to FIG. 1 it can be seen that the device comprises three components: an extension piece 1, a juice extractor basket 2 and a cone 3. In practice, taking acount of the difference sizes of citrus fruits, it will be necessary to provide at least two cones, one serving for example for juicing lemons and the other oranges or grapefruits.

The structure of the extension piece appears more clearly from the sections shown in FIGS. 2 and 3. It comprises a sleeve 11 which can be brought to surround the motor drive shaft A and which can be driven by this shaft e.g. via a flat. The sleeve 11 is prolonged by means of an axle 12, having at its upper part teeth 13 which come to engage with a corresponding part 31 of the cone via helical ramps.

The basket 2 comprises a basin 21 of plastics material such as makrolon, the base of which for example, may be pierced by orifices 22 the object of which is to separate the juice from the pulp of the fruit. On the other hand, the basin 21 has, in its lowest central part, a hollow hub 23 the object of which is to permit the passage of the sleeve 11 on the one hand and the passage of elastic prongs 32 formed in the interior of the cone on the other. Basket 2 has on its exterior periphery a bead 24 which is designed to allow the juice extractor basket to be placed on the bowl B of the kitchen robot. Bead 24 bears on the one hand tabs allowing bayonet fixture of the basket on to bowl B and on the other hand has a lateral projection 25 constituting a cam and which can act on the upper end of a push rod which acts on a contact for actuating the motor. Cone 3 has an external shape substantially that of cones used for pressing citrus fruit, that is to say, that it is substantially hemispherical and has on its upper part meridional ridges 33. The centre of the cone is hollow and has in its central part a sleeve 34 which is designed to fit on part 12 of extension piece 1.

As has been seen above, the basket carries means permitting the actuation of the device to be ensured. The extension piece mounted on the shaft A transmits the movement of this to the interior of the basket which is open. There is accordingly still a risk of accident if the user wants to mount a cone while the apparatus is in course of operation. According to one of the characteristics of the invention, the respective dimensions of the shaft 12 of the hub 23 and of the elastic prongs 32 are chosen in such a fashion that a cone can only be mounted on the shaft when the elastic prongs 32 have been previously introduced into the interior of the hub 23. In these conditions a cone can always be mounted by snapping it into position on the basket before putting the basket into place on the bowl. In fact, the external diameter of the elastic prongs 32 is slightly greater than the internal diameter of the orifice in the hub 23.

FIG. 2 shows the way in which the citrus press is mounted on a kitchen robot, that is to say, at a first stage the extension piece 1 is mounted on the motor axis A, a cone 3 being separately snap-fitted into position on basket 2. For example, the diameter of the orifice of hub 23 can be 18 mm while the external diameter of the elastic prongs 32 can be 20 mm. Then the basin is assembled on the bowl B, to the position shown in FIG. 3, and the device can be actuated by rotating the basket on the bowl.

FIG. 4 shows the extraction of a cone 3 out from basket 2. Once the basin has been separated from the bowl, the extension piece 1 is pulled off the motor axis A and turned upside down. It has at its lower end 14 a flared portion which, on being introduced over the prongs 32, urges these towards the centre and permits the cone to be released.

It goes without saying that modifications can be made to the embodiment which has just been described, notably by the substitution of equivalent technical means, without for that reason departing from the spirit and scope of the present invention. Thus for example, the projection which constitutes a cam integral with the basket can penetrate to the interior of the motor casing when this is disposed parallel to the bowl and not above this.

I claim:

1. A citrus press device for use with a food processor, said processor comprising a casing, an upwardly directed drive shaft and a bowl provided on the casing into which the upper of the end of the drive shaft penetrates, the device comprising a basket, the base of which includes apertures and a cone mounted in removable fashion inside the basket, wherein a hub portion is formed in the center of the base of the basket, said hub portion having an orifice, the cone including elastic prongs which penetrate into the hub portion, thereby mounting the cone to the basket, the exterior cylindrical surface defined by said prongs being of greater diameter than that of said hub portion orifice.

2. A citrus press device according to claim 1 wherein an extension piece is included between the cone and the drive shaft for forming a drive transmission, said extension piece comprising a lower part forming a sleeve adapted to surround the drive shaft and an upper part constituting a drive axle terminating at its upper end with helicoidal teeth and wherein cavities are provided on the upper interior part of the cone for driven cooperation with the helicoidal teeth on the axle, the diameter of the upper part of the extension piece being slightly smaller than the diameter of said hub portion orifice.

3. The device of claim 2 wherein the lower part of the extension piece has a flared portion enabling it to be introduced over the lower ends of the elastic prongs to urge the prong ends radially inwardly to permit the extraction of said cone from said hub portion by passage of said prongs through said orifice.

4. A citrus press devise according to claim 1, 2 or 3 wherein the edge of the basket carries means for fixing the basket to the upper part of the bowl and a cam means.

* * * * *